(12) United States Patent
Morimoto et al.

(10) Patent No.: US 8,880,089 B2
(45) Date of Patent: Nov. 4, 2014

(54) MOBILE COMMUNICATION SYSTEM AND RADIO RESOURCE ASSIGNMENT METHOD

(75) Inventors: Akihito Morimoto, Yokohama (JP); Motohiro Tanno, Yokohama (JP); Yoshihisa Kishiyama, Yokosuka (JP); Kenichi Higuchi, Saitama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 274 days.

(21) Appl. No.: 12/935,316

(22) PCT Filed: Mar. 30, 2009

(86) PCT No.: PCT/JP2009/056550
§ 371 (c)(1),
(2), (4) Date: Dec. 10, 2010

(87) PCT Pub. No.: WO2009/123146
PCT Pub. Date: Oct. 8, 2009

(65) Prior Publication Data
US 2011/0105138 A1    May 5, 2011

(30) Foreign Application Priority Data
Mar. 31, 2008    (JP) .................................. 2008-091399

(51) Int. Cl.
*H04W 72/00*    (2009.01)
*H04W 28/16*    (2009.01)
*H04W 88/08*    (2009.01)
*H04W 92/20*    (2009.01)
*H04W 8/20*    (2009.01)

(52) U.S. Cl.
CPC .............. *H04W 28/16* (2013.01); *H04W 88/08* (2013.01); *H04W 92/20* (2013.01); *H04W 8/20* (2013.01)
USPC ............................ 455/453; 455/450; 455/451

(58) Field of Classification Search
USPC .................................................. 455/450, 453
See application file for complete search history.

(56) References Cited

U.S. PATENT DOCUMENTS

| 7,853,282 B2 * | 12/2010 | Wu et al. ........................ 455/522 |
| 2004/0127191 A1 * | 7/2004 | Matsunaga ................... 455/403 |

(Continued)

FOREIGN PATENT DOCUMENTS

| JP | 2001-61180 A | 3/2001 |
| JP | 2003-18091 A | 1/2003 |

(Continued)

OTHER PUBLICATIONS

Patent Abstracts of Japan, Publication No. 2001-061180, dated Mar. 6, 2001, 1 page.

(Continued)

*Primary Examiner* — Kent Chang
*Assistant Examiner* — Benjamin Morales Fernandez
(74) *Attorney, Agent, or Firm* — Osha Liang LLP

(57) ABSTRACT

In a mobile communication system including a first base station and a second base station, the first base station includes: a user information obtaining unit configured to obtain user information in the first base station, and the second base station includes: a user information obtaining unit configured to obtain user information in the second base station; a base station internal information collection unit configured to collect user information in the first and the second base stations; and a resource assignment determination unit configured to determine radio resources that can be used by the first base station and radio resources that can be used by the second base station based on the user information in the first and the second base stations.

6 Claims, 8 Drawing Sheets

(56) References Cited

U.S. PATENT DOCUMENTS

| | | | |
|---|---|---|---|
| 2005/0288025 A1* | 12/2005 | Yoshida et al. | 455/442 |
| 2006/0209902 A1* | 9/2006 | Grilli et al. | 370/503 |
| 2006/0234756 A1* | 10/2006 | Yamasaki et al. | 455/525 |
| 2008/0014954 A1* | 1/2008 | Matsumoto et al. | 455/450 |
| 2008/0102853 A1* | 5/2008 | Kagimoto et al. | 455/453 |
| 2008/0108365 A1* | 5/2008 | Buddhikot et al. | 455/452.1 |
| 2010/0144365 A1* | 6/2010 | Pan et al. | 455/453 |

FOREIGN PATENT DOCUMENTS

| | | | |
|---|---|---|---|
| JP | 2003-18648 | A | 1/2003 |
| JP | 2004-207839 | A | 7/2004 |
| JP | 2005-333625 | A | 12/2005 |
| JP | 2006-157839 | A | 6/2006 |
| JP | 2007074718 | A | 3/2007 |
| WO | 2006064302 | A1 | 6/2006 |
| WO | 2008/004561 | A1 | 1/2008 |

OTHER PUBLICATIONS

Patent Abstracts of Japan, Publication No. 2003-018648, dated Jan. 17, 2003, 1 page.
Patent Abstracts of Japan, Publication No. 2003-018091, dated Jan. 17, 2003, 1 page.
3GPP TSG-RAN WG1 Meeting #44, R1-060670, "Interference Mitigation by Partial Frequency Reuse," Denver, USA, Feb. 13-17, 2006, 5 pages.
International Search Report issued in PCT/JP2009/056550, mailed on May 19, 2009, with translation, 9 pages.
Written Opinion issued in PCT/JP2009/056550, mailed on May 19, 2009, 3 pages.
Japanese Office Action for Application No. 2008-091399, mailed on Apr. 17, 2012 (5 pages).
Patent Abstracts of Japan for Japanese Publication No. 2006-157839, publication date Jun. 15, 2006 (1 page).
Patent Abstracts of Japan for Japanese Publication No. 2005-333625, publication date Dec. 2, 2005 (1 page).
Patent Abstracts of Japan for Japanese Publication No. 2004-207839, publication date Jul. 22, 2004 (1 page).
Office Action for Russian Application No. 2010142987/07 dated Feb. 7, 2013, with English translation thereof (6 pages).
English translation for Japanese Publication No. 2007-074718 published Mar. 22, 2007 (50 pages).
Office Action in counterpart Chinese Patent Application No. 200980119135.7, mailed Jul. 21, 2014, (14 pages).

* cited by examiner (A) CONFIGURATION EXAMPLE OF MOBILE COMMUNICATION SYSTEM (B) RESOURCE ASSIGNMENT EXAMPLE (A) CONFIGURATION EXAMPLE OF MOBILE COMMUNICATION SYSTEM (B) RESOURCE ASSIGNMENT EXAMPLE

FREQUENCY

US 8,880,089 B2

MOBILE COMMUNICATION SYSTEM AND RADIO RESOURCE ASSIGNMENT METHOD

TECHNICAL FIELD

The present invention relates to a mobile communication system and a radio resource assignment method.

BACKGROUND ART

In a mobile communication system of a conventional time division multiple access (TDMA) scheme, different frequencies are used in adjacent cells with each other. A group of frequencies is used for a set of a plurality of cells, and the same group of frequencies is used for another set of cells that is geographically distant. Although this method is preferable from the viewpoint of reducing other cell interference, frequency use efficiency is not necessarily high.

On the other hand, in the W-CDMA (Wideband Code Division Multiple Access) scheme such as IMT-2000, the same frequency is used in every cell by identifying users using spreading codes. This technique is called "one cell frequency repetition". According to the one cell frequency repetition, the frequency use efficiency and the system capacity largely increase. It is predicted that realizing the one cell frequency repetition is required in the future mobile communication system such as IMT-Advanced (also called LTE-Advanced in 3GPP (3rd Generation Partnership Project)) that will be studied later.

However, since the same frequency is used among the adjacent cells, there is fear that interference level (inter-cell interference) tends to become large particularly at the cell end.

As to inner-cell interference, in the W-CDMA scheme, OVSF (Orthogonal Variable Spreading Factor) code is used in the downlink for realizing inner-cell orthogonalization (that is, inter-user orthogonalization). However, in the W-CDMA scheme, orthogonalization cannot be realized in multipath environment, and uplink is non-orthogonal. By the way, in the E-UTRA (Evolved UMTS Terrestrial Radio Access) scheme, orthogonalization is realized by performing frequency scheduling in the base station for both of the uplink and the downlink.

On the other hand, as to the inter-cell interference, a technique called Inter-Cell Interference Coordination (ICIC) is used in the E-UTRA scheme for realizing inter-cell orthogonalization. In this technique, in addition to that a common frequency is used for every cell, a different frequency is used for each cell at the cell end (refer to non-patent document 1).

FIG. 1 is a diagram showing the inter-cell interference coordination adopted in the E-UTRA scheme. In the inter-cell interference coordination, radio resources are divided into radio resources R1-R3 that can be used only by respective base stations and radio resources R4-R8 that can be commonly used for all base stations. The radio resources R1-R3 are frequencies to be assigned to users at the cell end. The radio resources R4-R8 are frequencies to be assigned to users in an area other than the cell end (for example, users located near the base station). The radio resource R1 is used for users belonging to the cell end of the base station BS1, and the radio resource R1 is not used in adjacent base stations. In the same way, the radio resource R2 is used for users belonging to the cell end of the base station BS2, and the radio resource R2 is not used in adjacent base stations. The radio resource R3 is used for users belonging to the cell end of the base station BS3, and the radio resource R3 is not used in adjacent base stations. Therefore, users at the cell end of the base stations BS1-BS3 can perform communication in a state of small interference.

Information on the radio resources that can be used only by respective base stations is shared among base stations by using backhaul (core network) and/or radio control signal. The inter-cell interference coordination is called autonomous decentralized type inter-cell interference coordination.

In addition, for reducing inter-cell interference, a technique is being studied in which one base station collectively manages radio resources of adjacent base stations. Such an inter-cell interference technique is used for reducing inter-sector interference when the cell of the base station is divided into a plurality of sectors, and for reducing inter-cell interference when there is an overhang cell.

FIG. 2 is a diagram showing inter-cell interference coordination when the base station BS1 collectively manages radio resources of the base stations BS2 and BS3. The base station BS1 is connected to the adjacent base stations BS2 and BS3 using optical fibers and the like. The base station BS1 collectively assigns radio resources to be used by the adjacent base stations BS2 and BS3. For example, the base station BS1 assigns radio resources R1, R2 and R5 to users in the base station BS1, assigns radio resources R3 and R4 to users in the base station BS2, and assigns radio resources R6-R8 to users in the base station BS3.

Accordingly, the base station BS1 can assign radio resources such that interference does not occur. In this example, such inter-cell interference coordination is called centralized control type inter-cell interference coordination. In addition, the base station that collectively manages the radio resources is called a control base station or a centralized control base station, and a base station for which radio resources are managed by the control base station is called a remote base station.

[Non-patent document 1] 3GPP R1-060670, Siemens, "Interference Mitigation by Partial Frequency Reuse"

DISCLOSURE OF THE INVENTION

Problem to be Solved by the Invention

In the case of the autonomous decentralized type inter-cell interference coordination, the radio resources R1-R3 for users at the cell end are occupied by respective base stations. For example, when users at the cell end of the base station BS1 increase, assignment of the radio resource R1 increases. It can be considered to report this information to other base station using a backhaul control signal so as to increase the radio resource R1. But, it becomes low speed control, and rapid inter-cell orthogonalization cannot be realized.

On the other hand, in the case of the centralized control type inter-cell interference coordination, since the radio resources are collectively managed by the control base station, rapid inter-cell orthogonalization can be realized. However, when the number of base stations to be controlled by the control base station increases, processing load of the control base station increases.

An object of the present invention is to reduce processing load of the control base station that collectively manages the radio resources while realizing rapid inter-cell orthogonalization.

Means for Solving the Problem

For achieving the above-mentioned object of the present invention, the mobile communication of the present invention is, as a feature, a mobile communication system comprising a first base station and a second base station, the first base station including:
a user information obtaining unit configured to obtain user information in the first base station, and
the second base station including:
a user information obtaining unit configured to obtain user information in the second base station;
a base station internal information collection unit configured to collect user information in the first and the second base stations; and
a resource assignment determination unit configured to determine radio resources that can be used by the first base station and radio resources that can be used by the second base station based on the user information in the first and the second base stations.

The radio resource assignment method of the present invention is, as a feature, a radio resource assignment method for assigning radio resources in a mobile communication system including a first base station and a second base station, including:

a step in which the first base station obtains user information in the first base station,
a step in which the second base station obtains user information in the second base station,
a step in which the second base station collects user information in the first and the second base stations; and
a step in which the first base station determines radio resources that can be used by the first base station and radio resources that can be used by the second base station based on the user information in the first and the second base stations.

Effect of the Invention

According to an embodiment of the present invention, it becomes possible to reduce processing load of the control base station that collectively manages the radio resources while realizing rapid inter-cell orthogonalization.

Figure 1:
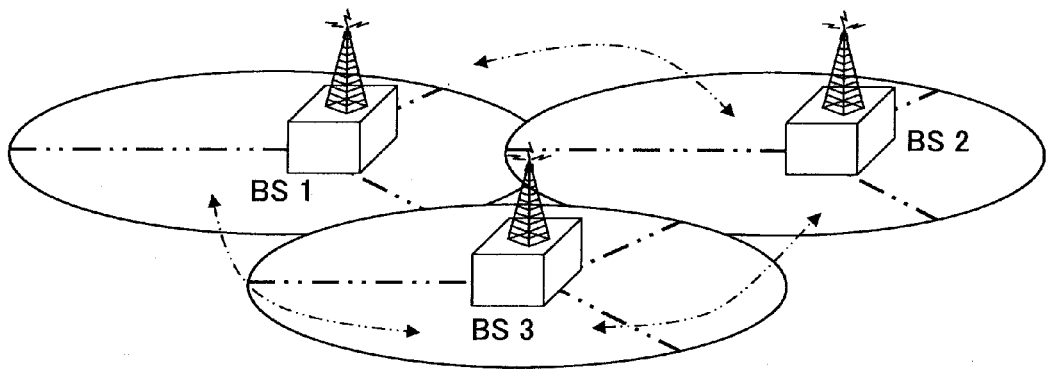
FIG. 1 is a diagram showing autonomous decentralized type inter-cell interference coordination.
Figure 1:
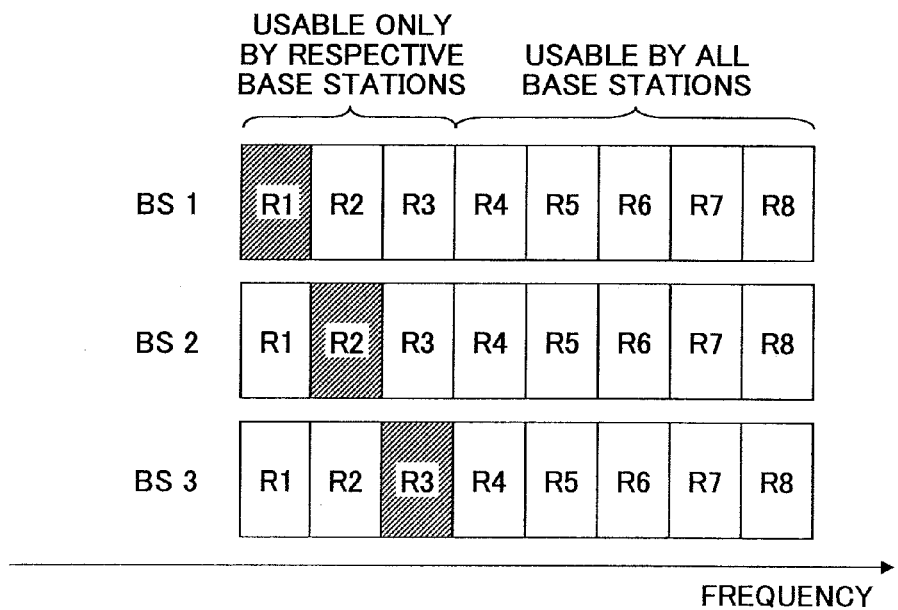
Figure 2:
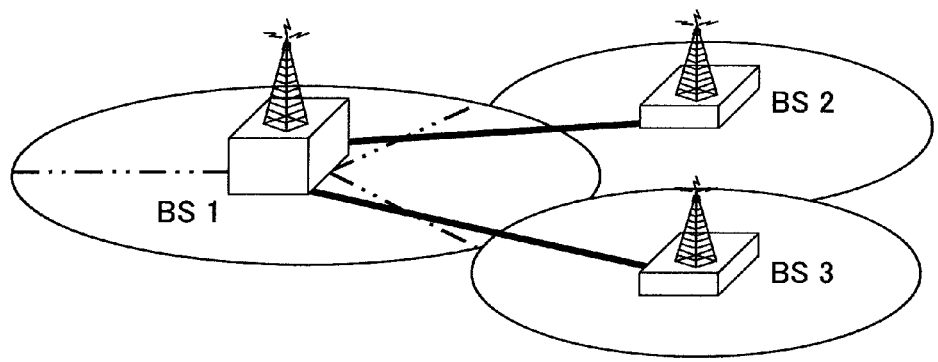
FIG. 2 is a diagram showing centralized control type inter-cell interference coordination.
Figure 2:
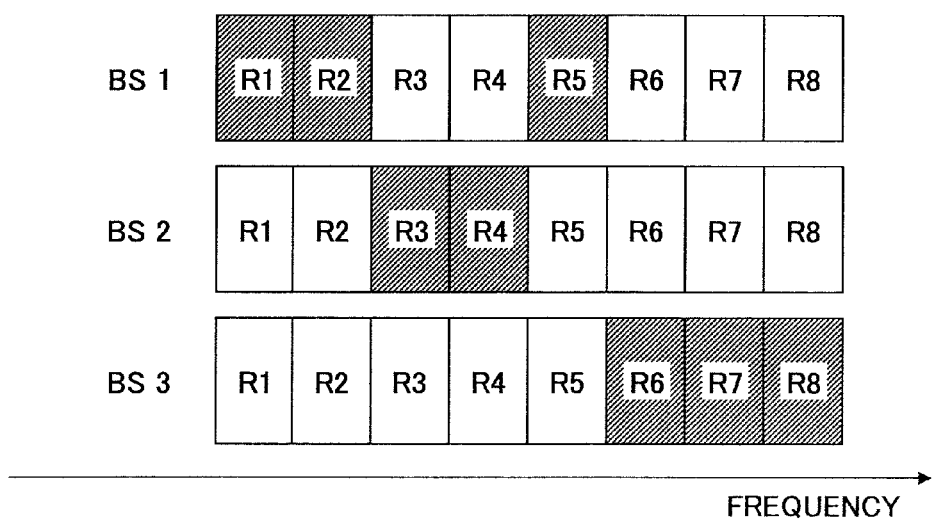

DESCRIPTION OF REFERENCE SIGNS 10 control base station
101 user information receiving unit
103 base station internal information collection unit
105 base station internal information transmission unit
107 resource assignment determination unit
109 assignment information transmission unit
111 data transmission unit
113 base station group determination unit
20 remote base station
201 user information receiving unit
205 base station internal information transmission unit
209 assignment information receiving unit
211 data transmission unit

PREFERRED EMBODIMENTS FOR CARRYING OUT THE INVENTION

In the following, an embodiment of the present invention is described with reference to figures.

In the embodiment of the present invention, processing load of the control base station is reduced while realizing rapid inter-cell orthogonalization by using the autonomous decentralized type inter-cell interference coordination and the centralized control type inter-cell interference coordination together.

Figure 3:
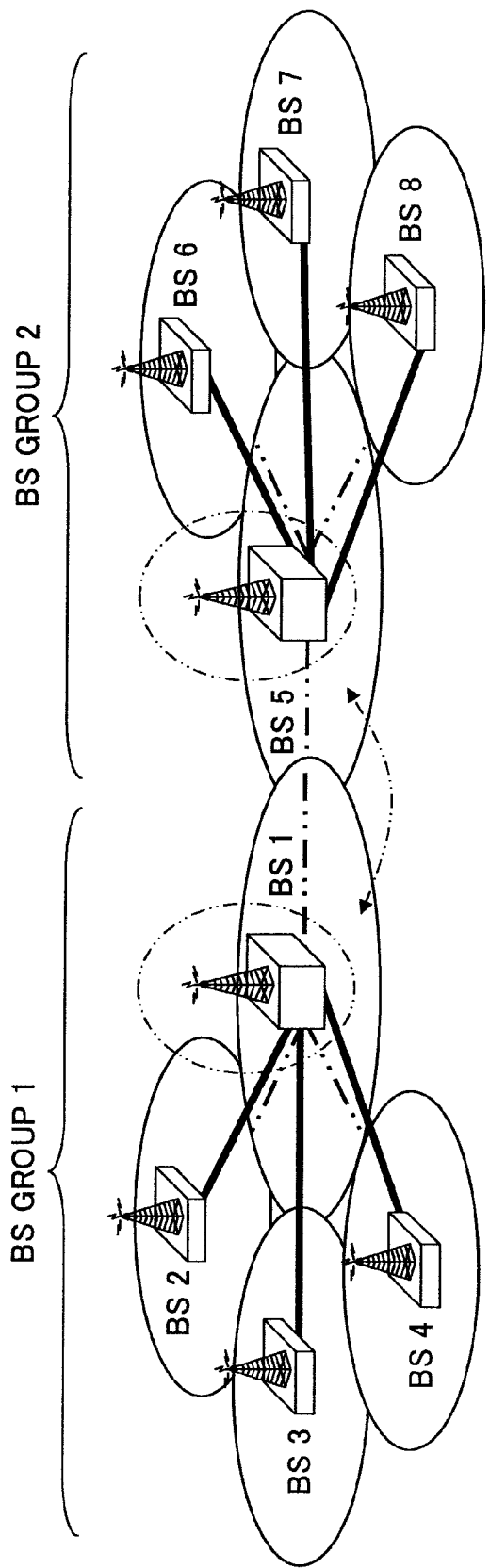
FIG. 3 is a diagram showing inter-cell interference coordination of an embodiment of the present invention.

FIG. 3 is a diagram showing inter-cell coordination in the case when using the autonomous decentralized type inter-cell interference coordination and the centralized control type inter-cell interference coordination together. The mobile communication system is divided into a plurality of base station groups (BS group 1 and BS group 2). A base station group is a set of base stations for which radio resources are managed by one control base station. Control base stations BS1 and BS5 exist in the base station groups 1 and 2 respectively. The control base station BS1 collectively manages radio resources of the base stations BS1-BS4 in the base station group. That is, in the base station group, centralized control type inter-cell interference coordination is performed by the control base station.

On the other hand, for users located at a boundary of communication areas covered by base stations belonging to the base station groups (at the cell end near BS5 in BS1, for example), the control base station BS1 assigns radio resources that can be used only by respective base stations. Information on the radio resources that can be used only by respective base stations is shared among control base stations using a backhaul and/or radio control signal. That is, the autonomous decentralized type inter-cell interference coordination is performed among base station groups.

Accordingly, since radio resources are collectively managed by the control base station in the base station group, inter-cell interference can be reduced. Since it is only necessary that the control base station manages radio resources of base stations in the base station group, processing load of the control base station can be reduced even when the number of base stations increases.

Figure 4:
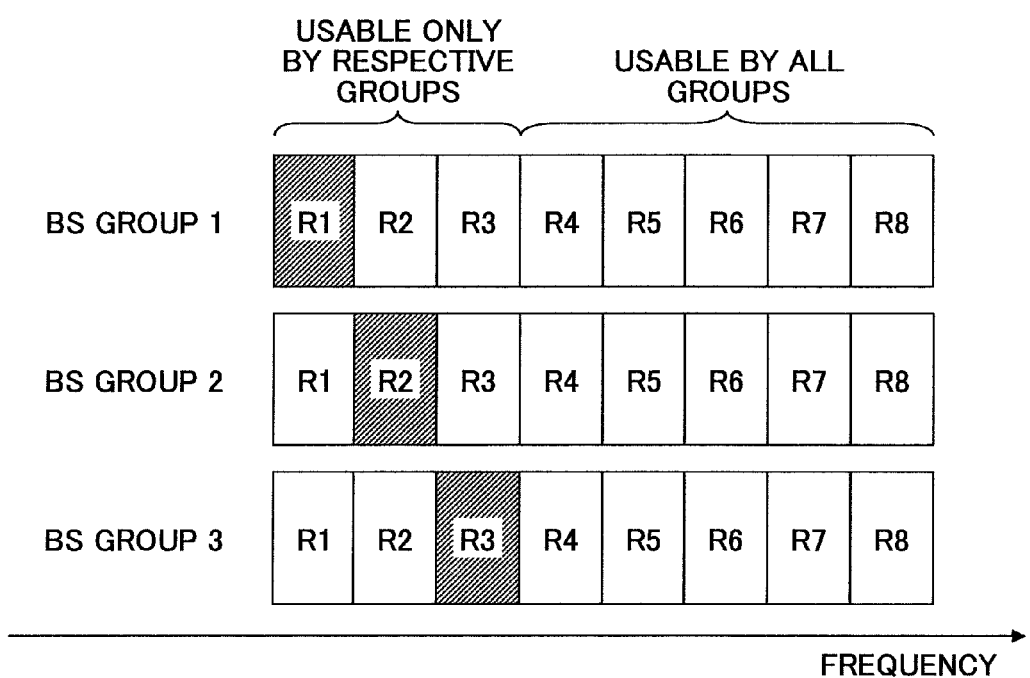
FIG. 4 is a diagram showing resource assignment in the inter-cell interference coordination of an embodiment of the present invention.

FIG. 4 is a diagram showing an example of radio resource assignment when using the autonomous decentralized type inter-cell interference coordination and the centralized control type inter-cell interference coordination together.

In the inter-cell interference coordination in the embodiment of the present invention, radio resources are divided into radio resources R1-R3 that can be used only by respective base station groups and radio resources R4-R8 that can be commonly used by all base station groups. The radio resources R1-R3 are frequencies assigned to users located at a communication area boundary of base station groups, and radio resources R4-R8 are frequencies assigned to users located at areas other than the communication area boundary of the base station groups (users located near the base station, users located at a cell boundary between the control base station and the remote base station, for example). The radio resource R1 is used for users belonging to the communication area boundary of the base station group 1, and the radio resource R1 is not used in the adjacent base station groups 2 and 3. In the same way, the radio resource R2 is used for users belonging to the communication area boundary of the base station group 2, and the radio resource R2 is not used in the adjacent base station groups 1 and 3. The radio resource R3 is used for users belonging to the communication area boundary of the base station group 3, and the radio resource R3 is not used in the adjacent base stations. Therefore, users located at the communication area boundary of the base station groups 1-3 can perform communication in a condition of small interference.

The control base station of the base station group 1 assigns radio resources to base stations in the base station group by using the radio resource R1 that can be used only by the base station group 1 and using the radio resources R4-R8 that can be commonly used by all base station groups. For example, the control base station BS1 shown in FIG. 3 assigns radio resources R1 and R4 to users in the control base station BS1, assigns radio resources R5 and R6 to users in the base station BS2, assigns radio resources R7 to users in the base station BS3, and assigns radio resources R8 to users in the base station BS4. Like the base stations BS2 and BS4 shown in FIG. 3, when the communication areas are separated to each other so that inter-cell interference is small, the control base station BS1 shown in FIG. 3 may assign the same radio resources to users in the base station BS2 and users in the base station BS4.

Accordingly, radio resources can be effectively utilized, throughput of users in the cell can be improved, and throughput of users at the cell end can be improved.

In the above-embodiment, although the radio recourses R1-R3 are described as usable only by respective base station groups, the radio resources R1-R3 may be set to be unusable by respective base station groups. For example, the radio resource R1 may be unusable only by the base station group 1, the radio resource R2 may be unusable only by the base station group 2, and the radio resource R3 may be unusable only by the base station group 3.

Figure 5:
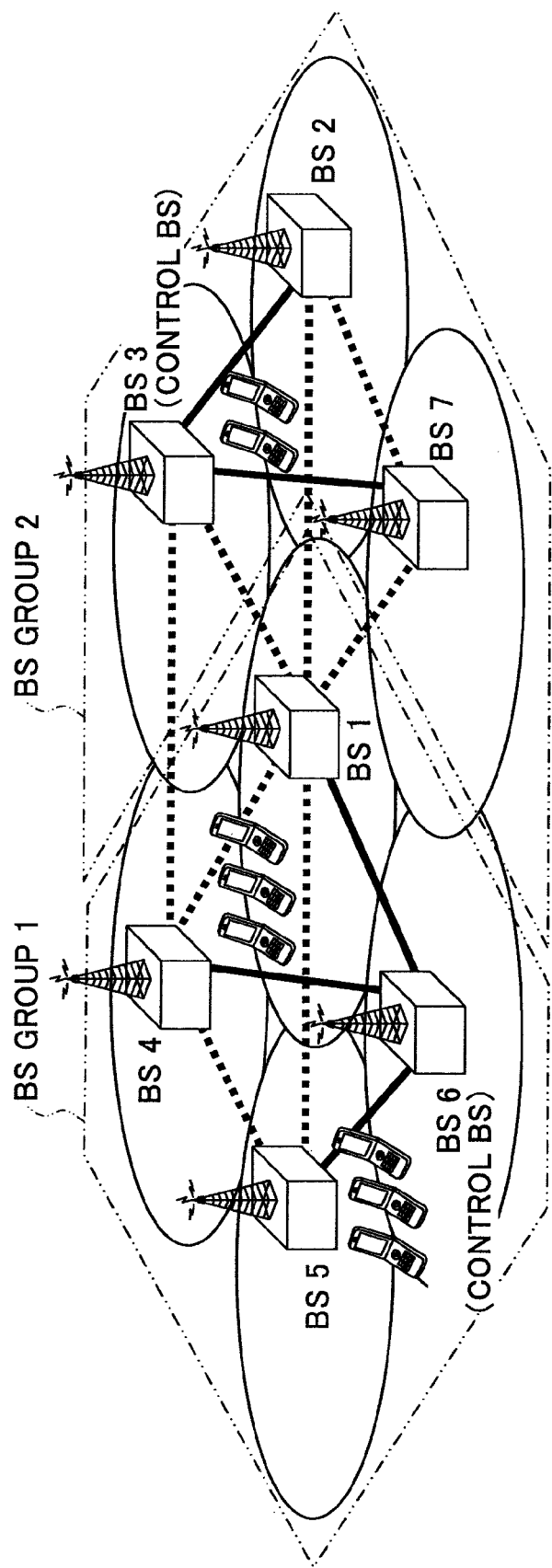
FIG. 5 is a diagram showing base stations grouped by the inter-cell interference coordination of an embodiment of the present invention (1)

FIG. 5 is a diagram showing an example of base station groups. The control base stations are distributed such that processing load decreases. Control base stations are determined based on the number of users, locations of users, traffic amount and reception quality and the like. As an example, the control base stations may be determined such that the number of remote base stations (or the number of users) controlled by respective control base stations becomes even. In the same way, the control base stations may be determined such that the traffic amount becomes even.

In addition, the control base station may adaptively change remote base stations belonging to the same base station group based on the number of users, the locations of users, traffic amount and the reception quality and the like. As an example, the control base station may determine remote base stations belonging to the same base station group such that the number of remote base stations (or the number of users) to be controlled by the control base station becomes even. In the same way, the control base station may determine remote base stations belonging to the same base station group such that the traffic amount becomes even. Also, the control base station may determine remote base stations belonging to the same base station group so as to reduce the number of users located at the communication area boundary of the base station group. In the same way, the control base station may determine remote base stations belonging to the same base station group so as to improve reception quality of the communication area boundary of the base station group.

A concrete example is described with reference to FIG. 5 in which the control base station determines remote base stations based on locations of users. For example, assuming that the base stations BS1-BS7 are connected by optical fibers and the like (shown as solid line or dotted line between base stations), the control base stations BS3 and BS6 can collect locations of users in each of the base stations BS1-BS7 via the optical fibers and the like. As a result, the control base stations BS3 and BS6 ascertain that many users are located between the base stations BS5 and BS6, many users are located between the base stations BS1 and BS4, and that many users are located between the base stations BS2 and BS3. In order to rapidly control inter-cell interference between the base stations BS5 and BS6, the base stations BS5 and BS6 are grouped into a same base station group. In the same way, the base stations BS1 and BS4 are grouped into a same base station group, and the base stations BS2 and BS3 are grouped in a same base station group. Then, the control base station BS6 groups the base stations BS1, BS4, BS5 and BS6 into a same base station group 1. For the base stations BS1, BS4 and BS5, assignment of radio resources are collectively managed by the control base station BS6.

Accordingly, by reducing the number of users located at the boundary of communication areas covered by base stations belonging to the base station group, the number of users controlled by the autonomous decentralized type inter-cell interference coordination can be reduced. Therefore, orthogonalization of users located at the boundary of communication areas of the base station groups can be easily realized.

Figure 6:
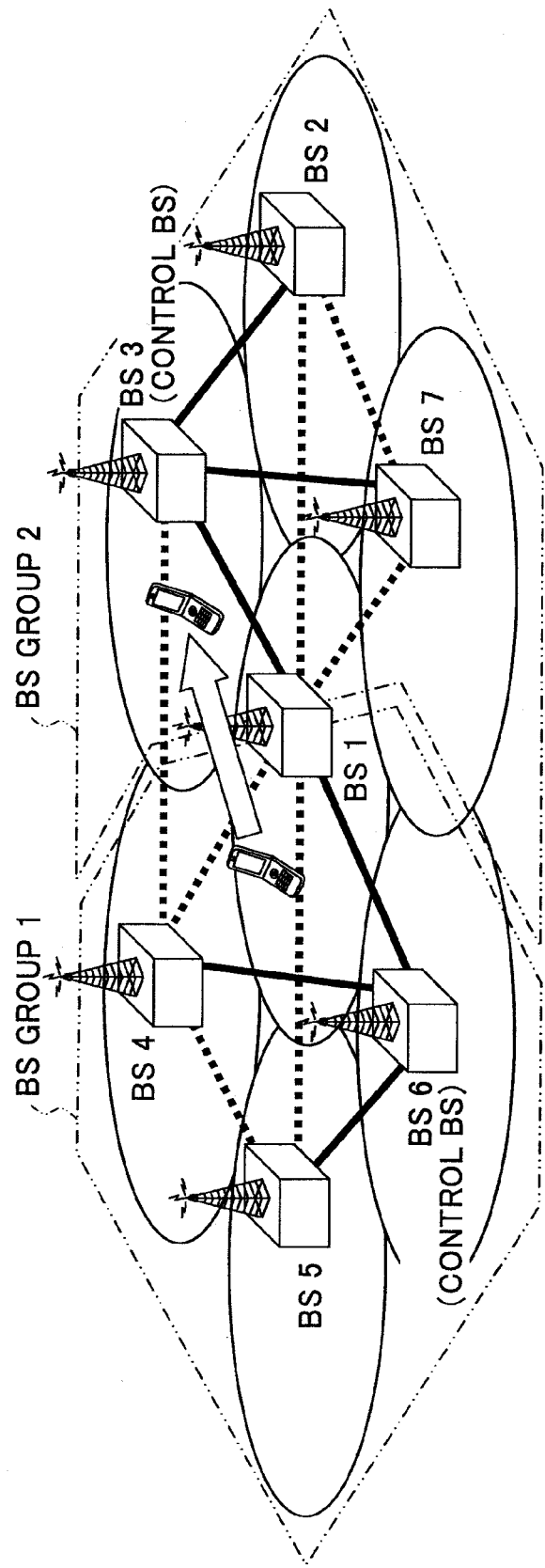
FIG. 6 is a diagram showing base stations grouped by the inter-cell interference coordination of an embodiment of the present invention (2)

FIG. 6 is a diagram showing another example of base station groups. The remote base station BS1 located at a boundary of communication areas covered by base stations belonging to respective base station groups 1 and 2 may be controlled by the control base stations BS6 and BS3 of the respective base station groups 1 and 2. That is, radio resources of the remote base station BS1 may be managed by both of the control base stations BS3 and BS6. For example, when there is a user moving from the base station BS1 to the base station BS3, the control base station to which the user belongs is changed from the control base station BS6 to the control base station BS3 according to the location of the user. Accordingly, by managing the radio resources of the remote base station BS1 by the plurality of control base stations BS3 and BS6, the control base station BS3 can efficiently assign radio resources to the user changing the base station group in the remote base station BS1.

Radio resources to be assigned to the remote base station BS1 from the control base station BS3 and radio resources to be assigned to the remote base station BS1 from the control base station BS6 are controlled such that the radio resources do not overlap by dividing frequency resources, for example.

<Configuration of Mobile Communication System>

Figure 7:
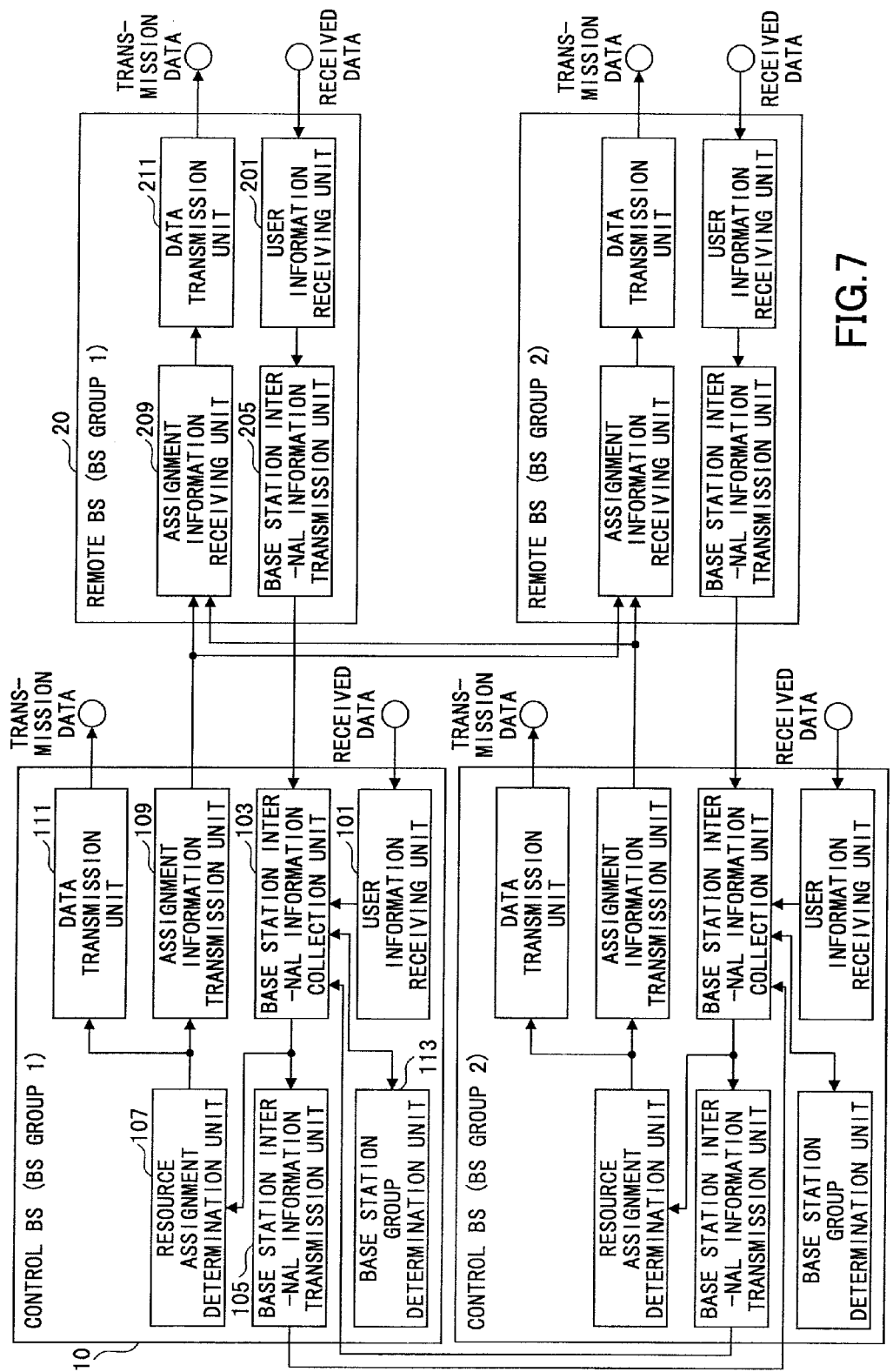
FIG. 7 is a block diagram of a mobile communication system of an embodiment of the present invention.

FIG. 7 is a block diagram of the mobile communication system of the embodiment of the present invention. The mobile communication system includes a plurality of base stations. The plurality of base stations are divided into base station groups. The base station group 1 includes a control base station 10 and a remote base station 20. Similarly, the base station group 2 includes a control base station and a remote base station. A base station group may include equal to or greater than two remote base stations. Also, any remote base station may not exist in a base station group.

The control base station 10 is a base station configured to collectively manage radio resources in the base station group, and includes a user information receiving unit 101, a base station internal information collecting unit 103, a base station internal information transmission unit 105, a resource assignment determination unit 107, an assigned information transmission unit 109, a data transmission unit 111, and a base station group determination unit 113.

The user information receiving unit 101 receives, from users in the control base station 10, user information such as the number of users, locations of users, traffic amount and reception quality. The user information may be determined in the control base station 10 based on signals received from the users.

The base station internal information collection unit 103 collects base station internal information such as user information received by the user information receiving unit 101 in the control base station 10 and processing load of the base station, and collects user information (or base station internal information) in the remote base station 20 belonging to the same base station group. In addition, the base station internal information collection unit 103 may collect user information (or base station internal information) in other base station from a base station (control base station, for example) of other base station group in order to change the base station group based on the user information (or base station internal information).

The base station internal information transmission unit 105 transmits, to other control base station, the user information (or base station internal information) collected by the base station internal information collection unit 103.

The resource assignment determination unit 107 determines radio resources that can be used by the control base station and radio resources that can be used by the remote base station. For example, as shown in FIG. 4, when the radio resources are divided into radio resources that can be used only by respective base station groups and radio resources that can be commonly used by all base station groups, the resource assignment determination unit 107 determines radio resources that can be used by the control base station 10 and radio resources that can be used by the remote base station 20 from among radio resources that can be used only by the base station group 1 and radio resources that can be commonly used by all base station groups.

The assignment information transmission unit 109 transmits assignment information of radio resources that can be used by the remote base station 20 to the remote base station 20.

The data transmission unit 111 assigns radio resources to be used for actual transmission of user data from among radio resources that can be used by the control base station 10, so as to perform data transmission.

The base station group determination unit 113 determines the base station group based on user information (or base station internal information) received not only from base stations in the same base station group but also from base stations in other base station group. As an example, the base station group determination unit 113 determines the base station group such that the number of remote base stations (or the number of users) or the traffic amount becomes even. As another example, the base station group determination unit 113 determines the base station group such that the number of users located at the communication area boundary of the base station group decreases or such that reception quality of the communication area boundary of the base station group improves. The determination of the base station group may be performed by one control base station in a centralized manner, or may be performed by a plurality of control base stations in collaboration with each other. The determined base station group is reported to the base station internal information collection unit 103. The base station internal information collection unit 103 collects user information (or base station internal information) in the determined base station group. In the same way, the resource assignment determination unit 107 determines radio resources in the determined base station group. For example, if the remote base station 20 does not belong to the same base station group, the base station internal information collection unit 103 does not collect user information (or base station internal information) from the remote base station 20. The base station group determination unit 113 is typically included in the base station, but, it may be included in a node such as an RNC (Radio Network Controller) that manages a plurality of base stations.

The remote base station 20 is a base station for which radio resources are managed by the control base station 10. The remote base station 20 includes a user information receiving unit 201, a base station internal information transmission unit 205, an assignment information receiving unit 209, and a data transmission unit 211.

The user information receiving unit 201 receives, from users in the remote base station 20, user information such as the number of users, locations of users, traffic amount, and reception quality.

The base station internal information transmission unit 205 transmits, to the control base station 10, base station internal information such as the user information received by the user information receiving unit 201 and processing load of the base station.

The assignment information receiving unit 209 receives assignment information of radio resources that can be used by the remote base station 20 from the control base station 10.

The data transmission unit 211 assigns radio resources to be actually used for transmission of user data from among radio resources that can be used by the remote base station 20 so as to perform data transmission.

As shown in FIG. 6, when the remote base station 20 belongs to a plurality of base station groups, the assignment information receiving unit 209 receives assignment information from a plurality of control base stations. Since the radio resources assigned by a plurality of control base stations are controlled such that they do not overlap with each other, the data transmission unit 211 determines the base station group according to the location of the user, and transmits data using radio resources assigned by a control base station of the determined base station group.

<Flowchart of Resource Assignment Method>

Figure 8:
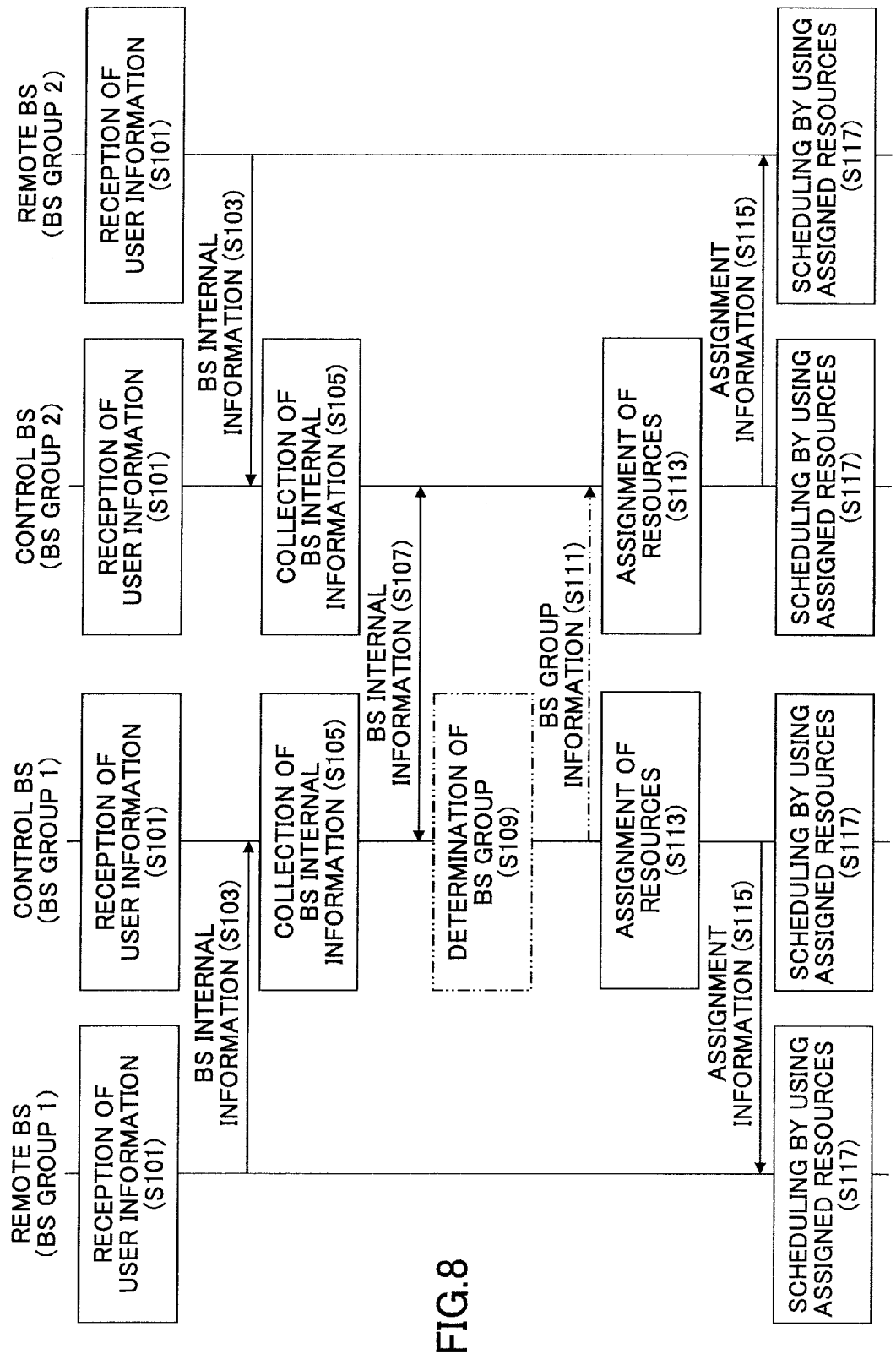
FIG. 8 is a flowchart of a resource assignment method of an embodiment of the present invention.

FIG. 8 is a flowchart of a resource assignment method of an embodiment of the present invention.

Each base station (control base station and remote base station) receives, from users in the base station, user information such as the number of users, locations of users, traffic amount and reception quality (S101). The remote base station transmits, to the control base station, base station internal information such as user information in the remote base station and processing load of the base station (S103). The control base station collects base station internal information in the control base station, and collects base station internal information in the remote base station (S105). The collected base station internal information may be exchanged among base station groups (S107). The control base station may determine the base station group based on the base station internal information in the same base station group and the base station internal information in other base station group (S109). The determined base station group may be reported to the control base station in the other base station group (S111).

The control base station determines radio resources that can be used by the control base station and radio resources that can be used by the remote base station (S113). The control base station transmits, to the remote base station, assignment information of the radio resources that can be used by the remote base station (S115). Then, each base station (control base station and remote base station) determines radio resources to be actually used for transmitting and receiving user data from among radio resources that can be used by respective base station (S117).

As described above, according to the embodiment of the present invention, processing load of the control base station that collectively manages radio resources can be reduced while realizing rapid inter-cell orthogonalization.

The embodiment of the present invention is not only applicable to the mobile communication system of the E-UTRA scheme and the IMT-Advanced scheme but also applicable to any mobile communication system in which there is a possibility of occurrence of inter-cell interference.

The present invention is not limited to the above-mentioned embodiments, so that various modifications and applications are available without departing from the scope of the present invention.

The present international application claims priority based on Japanese patent application No. 2008-091399, filed in the JPO on Mar. 31, 2008 and the entire contents of the Japanese patent application No. 2008-091399 are incorporated herein by reference.

The invention claimed is:

1. A mobile communication system comprising a plurality of groups, each one of the plurality of groups comprising:
a first base station; and
a second base station that is a control base station,
wherein the first base station comprises:
a user information obtaining unit configured to obtain user information in the first base station, and
wherein the second base station comprises:
a user information obtaining unit configured to obtain user information in the second base station;
a base station internal information collection unit configured to collect user information in the first and the second base stations;
a resource assignment determination unit configured to determine radio resources that can be used by the first base station and radio resources that can be used by the second base station based on the user information in the first and the second base stations; and
a base station group determination unit configured to change base stations to be included in a group to which the second base station belongs, and to be controlled by the resource assignment determination unit based on user information received from another control base station of a group different from a group to which the second base station belongs.

2. The mobile communication system as claimed in claim 1,
wherein the base station group determination unit is further configured to determine a group of base stations to be controlled by the resources assignment determination unit based on user information received from other base station,
wherein the base station internal information collection unit collects the user information in the first base station when the first base station is included in the group of the base stations, and
wherein the resource assignment determination unit determines the radio resources that can be used by the first base station when the first base station is included in the group of the base stations.

3. The mobile communication system as claimed in claim 2, wherein the base station group determination unit determines the group of the base stations so as to reduce the number of users located at a communication area boundary of the group of the base stations.

4. The mobile communication system as claimed in claim 1, further comprising a third base station,
wherein the third base station comprises:
a user information obtaining unit configured to obtain user information in the third base station;
a base station internal information collection unit configured to collect user information in the first and the third base stations; and
a resource assignment determination unit configured to determine radio resources that can be used by the first base station and radio resources that can be used by the third base station based on the user information in the first and the third base stations,
wherein the radio resources assigned to the first base station by the radio resource assignment unit of the second base station do not overlap with the radio resources assigned to the first base station by the radio resource assignment unit of the third base station.

5. The mobile communication system as claimed in claim 1, wherein the user information includes at least one of:
the number of users;
locations of users;
traffic amount in communication with the users; and
reception quality in communication with the users.

6. A radio resource assignment method for assigning radio resources in a mobile communication system comprising a plurality of groups, each one of the plurality of groups comprising a first base station and a second base station, wherein the radio resource assignment method comprises:
obtaining, with the first base station, user information in the first base station,
obtaining, with the second base station, user information in the second base station,
collecting, with the second base station, user information in the first and the second base stations;
determining, with the first base station, radio resources that can be used by the first base station and radio resources that can be used by the second base station based on the user information in the first and the second base stations; and
changing, with a base station group determination unit, base stations to be included in a group to which the second base station belongs, and to be controlled by the resource assignment determination unit based on user information received from another control base station of a group different from a group to which the second base station belongs.

* * * * *